(12) United States Patent
Jo et al.

(10) Patent No.: US 10,998,548 B2
(45) Date of Patent: May 4, 2021

(54) POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

(71) Applicant: LG Chem, Ltd., Seoul (KR)

(72) Inventors: Chi Ho Jo, Daejeon (KR); Ji Hoon Ryu, Daejeon (KR); Min Suk Kang, Daejeon (KR); Sun Sik Shin, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 45 days.

(21) Appl. No.: 15/515,728

(22) PCT Filed: Oct. 2, 2015

(86) PCT No.: PCT/KR2015/010447
§ 371 (c)(1),
(2) Date: Mar. 30, 2017

(87) PCT Pub. No.: WO2016/053053
PCT Pub. Date: Apr. 7, 2016

(65) Prior Publication Data
US 2017/0309910 A1    Oct. 26, 2017

(30) Foreign Application Priority Data

Oct. 2, 2014 (KR) .................. 10-2014-0133428
Oct. 2, 2014 (KR) .................. 10-2014-0133429
Oct. 1, 2015 (KR) .................. 10-2015-0138746

(51) Int. Cl.
*H01M 4/525* (2010.01)
*H01M 10/0525* (2010.01)
*H01M 4/36* (2006.01)
*C01G 51/00* (2006.01)
*H01M 10/052* (2010.01)

(52) U.S. Cl.
CPC .......... *H01M 4/525* (2013.01); *C01G 51/42* (2013.01); *H01M 4/366* (2013.01); *H01M 10/0525* (2013.01); *C01P 2002/50* (2013.01); *C01P 2002/76* (2013.01); *C01P 2002/85* (2013.01); *C01P 2004/04* (2013.01); *C01P 2004/61* (2013.01); *C01P 2006/40* (2013.01); *H01M 10/052* (2013.01); *H01M 2220/20* (2013.01); *Y02E 60/10* (2013.01)

(58) Field of Classification Search
CPC .... H01M 4/525; H01M 10/0525; C01G 51/42
See application file for complete search history.

(56) References Cited

U.S. PATENT DOCUMENTS

| | | |
|---|---|---|
| 2002/0031703 A1 | 3/2002 | Kameyama et al. |
| 2004/0200998 A1* | 10/2004 | Park ...................... C01G 51/42 |
| | | 252/500 |
| 2006/0063070 A1 | 3/2006 | Chiga et al. |
| 2006/0246352 A1* | 11/2006 | Kweon ............... C01G 45/1228 |
| | | 429/231.95 |
| 2007/0218363 A1 | 9/2007 | Paulsen et al. |
| 2010/0203388 A1 | 8/2010 | Kim et al. |
| 2010/0297686 A1 | 11/2010 | Gogotsi et al. |
| 2012/0009476 A1 | 1/2012 | Park et al. |
| 2013/0171523 A1 | 7/2013 | Chen et al. |
| 2013/0183583 A1 | 7/2013 | Kim et al. |
| 2014/0045067 A1 | 2/2014 | Cho et al. |
| 2014/0193714 A1 | 7/2014 | Kim et al. |
| 2014/0212745 A1 | 7/2014 | Kim et al. |
| 2014/0242463 A1 | 8/2014 | Song et al. |
| 2017/0222225 A1* | 8/2017 | Kang ..................... H01M 4/525 |

FOREIGN PATENT DOCUMENTS

| | | |
|---|---|---|
| CN | 1574445 A | 2/2005 |
| CN | 101657920 A | 2/2010 |
| CN | 102306768 A | 1/2012 |
| CN | 102631875 A | 8/2012 |
| CN | 1665052 B | 4/2013 |

(Continued)

OTHER PUBLICATIONS

International Search Report From PCT/KR2015/010447 dated Jan. 25, 2016.
Written Opinion of the International Searching Authority for PCT/KR2015/010447 dated Jan. 25, 2016.
S. Choi and A. Manthiram, "Chemical Synthesis and Properties of Spinel Li1-xCo2O4-d." Materials Science and Engineering Program, ETC 9.104. The University of Texas at Austin, Austin Texas 78712 (2002).
A. Van Der Ven and G. Ceder, "Electrochemical properties of spinel LixCoO2 : A first-principles investigation." Department of Materials Science and Engineering, Massachusetts Institute of Technology, Physical Review B, vol. 59, No. 2, (Jan. 1, 1999).

(Continued)

*Primary Examiner* — Miriam Stagg
*Assistant Examiner* — Claire L Roe
(74) *Attorney, Agent, or Firm* — Lerner, David, Littenberg, Krumholz & Mentlik, LLP

(57) ABSTRACT

The present invention provided a positive electrode active material for a lithium secondary battery including lithium cobalt oxide particles. The lithium cobalt oxide particles include lithium deficient lithium cobalt oxide having Li/Co molar ratio of less than 1, belongs to an Fd-3m space group, and having a cubic crystal structure, in surface of the particle and in a region corresponding to a distance from 0% to less than 100% from the surface of the particle relative to a distance (r) from the surface to the center of the particle. In the positive electrode active material for a lithium secondary battery according to the present invention, the intercalation and deintercalation of lithium at the surface of a particle may be easy, and the output property and rate characteristic may be improved when applied to a battery.

8 Claims, 4 Drawing Sheets

(56) References Cited

FOREIGN PATENT DOCUMENTS

| | | | |
|---|---|---|---|
| CN | 103715424 | A | 4/2014 |
| EP | 2405521 | A1 | 1/2012 |
| EP | 2662914 | A2 | 11/2013 |
| EP | 2704236 | A2 | 3/2014 |
| EP | 3159307 | A1 | 4/2017 |
| JP | 2003217586 | A | 7/2003 |
| JP | 2006092820 | A | 4/2006 |
| JP | 2009004310 | A | 1/2009 |
| JP | 2017535918 | A | 11/2017 |
| KR | 20030083476 | A | 10/2003 |
| KR | 20060130964 | A | 12/2006 |
| KR | 20120004340 | A | 1/2012 |
| KR | 20120009891 | A | 2/2012 |
| KR | 20120121235 | A | 11/2012 |
| KR | 20140095810 | A | 8/2014 |

OTHER PUBLICATIONS

R J Gummow, D C Liles and M M Thackeray, "Spinel Versus Layered Structures For Lithium Cobalt Oxide Synthesised at 400° C." Materials Research Bulletin, vol. 28, pp. 235-246 (1993).
Extended European Search Report for Application No. EP15846551 dated Nov. 24, 2017.
Chinese Search Report for CN Application No. 201580054001.7, dated Nov. 30, 2018.
Search Report from Indian Office Action for Application No. 201717011388 dated Feb. 1, 2021; 1 page.

* cited by examiner

POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2015/010447, filed Oct. 2, 2015, which claims priority to Korean Patent Application Nos. 10-2014-0133428 and 10-2014-0133429, filed on Oct. 2, 2014, and Korean Patent Application No. 10-2015-0138746, filed Oct. 1, 2015, the disclosures of which are incorporated herein by reference.

TECHNICAL FIELD

The present invention relates to a positive electrode active material for a lithium secondary battery, a method of preparing the same, and a lithium secondary battery including the same.

BACKGROUND ART

As technical developments and demands on mobile devices are increasing, demands on secondary batteries as an energy source is being rapidly increasing. Among the secondary batteries, lithium secondary batteries having high energy density and voltage, long cycle life, and low self-discharge rate are commercialized and widely used.

However, the lithium secondary battery has a limitation that the life thereof decreases rapidly via repeating charge and discharge. Particularly, the limitation is more serious at high temperatures. The reason is that an electrolyte may be decomposed due to moisture in the battery or other factors, an active material may be deteriorated, or the internal resistance of the battery may increase.

A positive electrode active material for a lithium secondary battery, which is being actively researched, developed and used, is $LiCoO_2$ with a layered structure. $LiCoO_2$ may be easily synthesized and has good electrochemical properties including life property, and is the most widely used material. However $LiCoO_2$ has low structural stability, and the application thereof to a battery with high capacity is limited.

As the substituents of the positive electrode active material, various lithium transition metal oxides such as $LiNiO_2$, $LiMnO_2$, $LiMn_2O_4$, or $LiFePO_4$ have been developed. $LiNiO_2$ has merits of providing the battery properties of high discharge capacity, however is hardly synthesized by a simple solid phase reaction and has low thermal stability and cycle property. In addition, lithium manganese oxides such as $LiMnO_2$ or $LiMn_2O_4$ have merits of good thermal stability and low cost, however have limitations of a small capacity and inferior properties at high temperatures. Particularly, for $LiMn_2O_4$, some products are commercialized at low cost; however the life property thereof is not good due to Jahn-Teller distortion owing to $Mn^{3+}$. Since $LiFePO_4$ is inexpensive and safe, a lot of research is being conducted for the use in a hybrid electric vehicle (HEV), however the application thereof to another fields is hard due to low conductivity.

Due to such circumstances, a lithium nickel manganese cobalt oxide, $Li(Ni_xCo_yMn_z)O_2$ (where x, y, and z are atomic fraction of each independent oxide component elements and satisfy $0<x\leq1$, $0<y\leq1$, $0<z\leq1$, and $0<x+y+z\leq1$), receives much attention as the substituting positive electrode active material of $LiCoO_2$. This material is cheaper than $LiCoO_2$ and has merits of being used under a high capacity and a high voltage. However, the material has demerits of not providing good rate characteristic and life property at high temperatures. In order to increase the structural stability of the lithium nickel manganese cobalt oxide, the amount of Li relative to the amount of a transition metal included in the oxide is increased.

Recently, as the size of portable devices such as mobile phones and tablet computers is gradually miniaturized, batteries applied thereto are also required to be miniaturized together with high capacity and high energy. In order to increase the energy of a battery per unit volume, the packing density of an active material is required to be increased. In order to increase the packing density, active materials having a large size are preferable. However, the active materials having a large size have a relatively small surface area, and thus, an active area making contact with an electrolyte may be also narrow. The narrow active area may be kinetically unfavorable, and relatively low rate characteristic and initial capacity may be attained.

DISCLOSURE OF THE INVENTION

Technical Problem

According to a first aspect of the present invention, there is provided a positive electrode active material for a lithium secondary battery, in which the intercalation and deintercalation of lithium ions at the surface of particles may be easy, output property and rate characteristic may be improved when applied to a battery, life property may be improved even with large-sized particles, and the generated amount of gas may be minimized.

According to a second aspect of the present invention, there is provided a method of preparing the positive electrode active material.

According to a third aspect of the present invention, there is provided a positive electrode including the positive electrode active material.

According to a fourth aspect of the present invention, there is provided a lithium secondary battery, a battery module, and a battery pack including the positive electrode.

Technical Solution

According to an embodiment of the present invention to solve the above-described tasks, there is provided a positive electrode active material for a lithium secondary battery including lithium cobalt oxide particles, in which the lithium cobalt oxide particles include lithium deficient lithium cobalt oxide having a Li/Co molar ratio of less than 1, belongs to an Fd-3m space group, and having a cubic crystal structure, on a surface of the particle and in a region corresponding to a distance from 0% to less than 100% from the surface of the particle relative to a distance (r) from the surface to the center of the particle.

According to another embodiment of the present invention, there is provided a method of preparing the positive electrode active material for a lithium secondary battery including preparing second lithium cobalt oxide particles by mixing a cobalt raw material and a lithium raw material in amounts satisfying the molar ratio of $1\leq Li/Co$, and first heating; and second heating the second lithium cobalt oxide particles, more than once.

According to a further another embodiment of the present invention, there is provided a positive electrode for a lithium secondary battery, including the positive electrode active material.

Furthermore, according to a further another embodiment of the present invention, there is provided a lithium secondary battery, a battery module, and a battery pack including the positive electrode.

Particulars of exemplary embodiments of the present invention will be included in the following detailed explanation.

Effects of the Invention

The positive electrode active material for a lithium secondary battery according to the present invention is provided a lithium deficient structure by which the intercalation and deintercalation of lithium ions may be easy, included on the surface side of the active material particles, and the transport rate of the lithium ions may increase, thereby improving rate characteristic when applied to a battery. Also, the resistance at the surface of the active material may decrease, and capacity property may be improved without worrying about the deterioration of an initial capacity. Further, good life property may be realized even with large-sized particles, and at the same time, the energy density of a battery may be improved because of the increase of the density of a positive electrode. Therefore, the positive electrode active material for a lithium secondary battery according to the present invention may be particularly readily applied as the positive electrode active material of a battery for a high voltage of 4.4 V or more.

BRIEF DESCRIPTION OF THE DRAWINGS

The accompanying drawings in the present disclosure illustrate preferred embodiments of the present invention, and serve to further understanding of the principles of the present invention together with the description. The present invention should not be construed as limited to the description in the drawings.

BEST MODE FOR CARRYING OUT THE INVENTION

Figure 1:
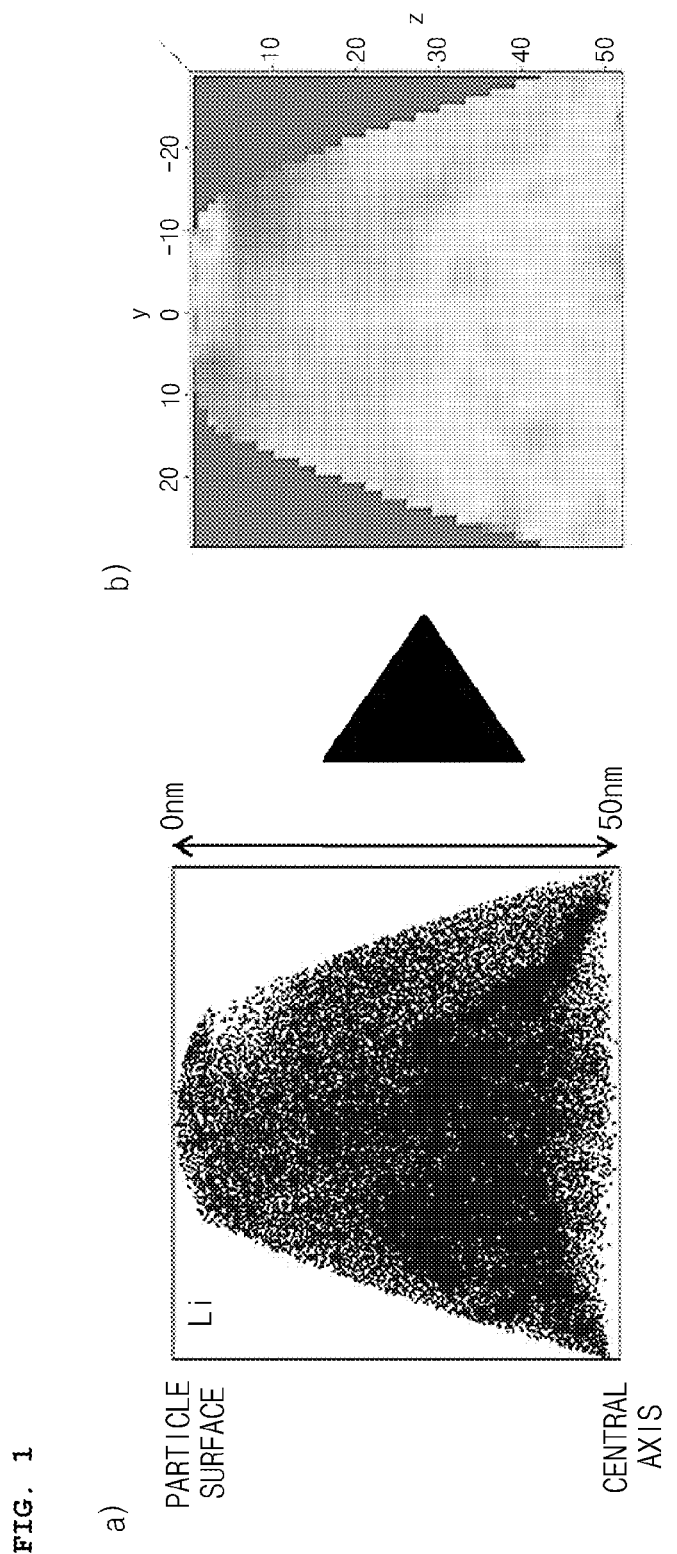
FIG. 1 illustrates photographic images for observing lithium distribution in the surface side of a particle in a positive electrode active material prepared in Preparation Example 2 using an atom probe tomography (APT)

Hereinafter, the present invention will be explained in more detail to assist the understanding of the present invention.

It will be further understood that terms or words used in the description and claims should not be interpreted as having a meaning such as those used in common or defined in dictionaries, however should be interpreted as having a meaning and concept that is consistent with the technical spirit of the present invention on the basis of a principle that an inventor may define the concept of terms appropriately to explain his invention by the best way.

Generally, the rate characteristic of a positive electrode active material is dependent on the rate of an interface reaction between a positive electrode active material and an electrolyte. The present invention may improve the rate characteristic when applied to a battery by forming a lithium deficient structure by which the intercalation and deintercalation of lithium ions may be easy at the exterior of the lithium cobalt oxide particles, that is, at the surface side, and three-dimensional transport of lithium ions may be possible in the preparing of the positive electrode active material. In addition, since the resistance at the surface of the active material particles decreases, output property may be improved. Therefore, good life property may be attained even though the positive electrode active material has large-sized particles, and the energy density of a battery may be improved due to the increase of the density of a positive electrode.

That is, the positive electrode active material for a lithium secondary battery according to an embodiment of the present invention includes lithium cobalt oxide particles.

The lithium cobalt oxide particles include lithium deficient lithium cobalt oxide having a molar ratio of Li/Co of less than 1, are belongs to an Fd-3m space group, and having a cubic crystal structure, in the surface side of the particle, that is, in the surface of the particle and in a region corresponding to a distance from 0% to less than 100% from the surface of the particle relative to a distance (r) from the surface to the center of the particle.

Particularly, in the positive electrode active material according to an embodiment of the present invention, the lithium cobalt oxide particles include lithium deficient lithium cobalt oxide that has a Li/Co molar ratio of less than 1, and more particularly, from 0.95 to less than 1 in the surface sides of the particles.

Different from common lithium cobalt oxide having a layered crystal structure, the lithium deficient lithium cobalt oxide may have a cubic crystal structure belongs to an Fd-3m space group, and the lattice constant (a0) thereof may be from 7.992 to 7.994 (25° C.). The crystal structure is similar to a spinel crystal structure, and lithium ions may transport in a three-dimensional direction like in the spinel crystal structure. Accordingly, the transport of the lithium ions may be easy, and the rate may be fast when compared to those in a layered structure in which the lithium ions may transport in a two-dimensional direction, and so, the intercalation and deintercalation of the lithium ions may become easier. In the present invention, the lithium deficient lithium cobalt oxide that has the above-described crystal structure and favorable mechanical property is provided in the surface side of the particles, and the transport of the lithium ions may be easy, and rate characteristic may be improved when applied to a battery. In addition, due to the decrease of resistance at the surface side of the active material, output property may be improved.

The crystal structure of the lithium deficient lithium cobalt oxide may be identified by a common identification method of a crystal structure, and the crystal structure may particularly be identified using a transmission electron microscope.

More particularly, the lithium deficient lithium cobalt oxide may include first lithium cobalt oxide of the following Formula 1.

$$Li_{1-a}CoM_xO_2 \quad \text{[Formula 1]}$$

In Formula 1, a and x are atomic fractions of each independent oxide component elements and satisfies the following relations of 0<a≤0.05, and 0≤x≤0.02.

In Formula 1, M includes at least one metal element selected from the group consisting of W, Mo, Zr, Ti, Mg, Ta, Al, Fe, V, Cr, Ba, Ca, and Nb as a doping element, and may be included in the first lithium cobalt oxide in an amount such that x satisfies the relation of 0≤x≤0.02. As described above, in the case where the metal element is further doped into the lithium deficient lithium cobalt oxide, structural stability may be improved, and there would be no more concern on the deterioration of the structural stability of the positive electrode active material due to lithium deficiency. In addition, the output property of a battery may be improved, and by doping the above-described amount, the improving effect thereof may be further improved.

More particularly, in the positive electrode active material for a lithium secondary battery according to an embodiment of the present invention, the lithium cobalt oxide particles may have a core-shell structure. In this case, a shell part may include lithium deficient first lithium cobalt oxide of the following Formula 1, and a core part may include second lithium cobalt oxide of the following Formula 2.

$$Li_{1-a}CoM_xO_2 \quad \text{[Formula 1]}$$

$$Li_bCoM'_yO_2 \quad \text{[Formula 2]}$$

(In Formula 1 and 2, M and M' each independently includes at least one metal element selected from the group consisting of W, Mo, Zr, Ti, Mg, Ta, Al, Fe, V, Cr, Ba, Ca, and Nb, and a, b, x, and y are the atomic fractions of each independent oxide component elements and satisfies the following relations of 0<a≤0.05, 1≤b≤1.2, 0≤x≤0.02, and 0≤y≤0.02.)

In Formula 1, the two relations of 0<a≤0.05, and 1≤b≤1.2 are satisfied at the same time, the improving effect of rate characteristic according to the formation of a lithium deficient structure may be further improved by 10% or more when compared to an active material with a greater than 0.05 and with b greater than 1.2. The improving effect of the rate characteristic may be the improved to the maximum of 30% when compared to lithium cobalt oxide (LiCoO₂) without forming a lithium deficient structure.

In the lithium cobalt oxide particles, the first lithium cobalt oxide may have the spinel-like structure as described above, that is, may belongs to an Fd-3m space group, have a cubic crystal structure, and the second lithium cobalt oxide may have a layered structure.

As described above, concerning the transport of the lithium ions, the positive electrode active material according to an embodiment of the present invention includes lithium cobalt oxide having a deficient structure enabling the three-dimensional transport of lithium ions in the surface side of the active material particles, that is, in a shell part, and the transport of lithium may become easy, the initial battery internal resistance of a lithium secondary battery may decrease, and the rate characteristic and the output property of a battery may be improved. In addition, by including lithium rich lithium cobalt oxide having a Li/Co ratio of 1 or more in the inner part of the active material particles, that is, in the core part, the structural stability of the active material, particularly, the structural stability thereof at high temperatures may be improved, and the deterioration of capacity at high temperatures may be prevented. Such effects may be more effective for a positive electrode active material with large-sized particles.

In consideration of the control of the Li/Co ratio according to the position in the active material particle and the remarkable improving effect therefrom, the two relations of 0.01<a≤0.05, and 1≤b≤1.05 may be satisfied in Formula 1 and 2.

More particularly, in the positive electrode active material having the core-shell structure, the core part and the shell part may include lithium distributed with a gradually increasing concentration gradient toward the center of the active material particle in each region.

In this case, the concentration gradient slope of the lithium in the core part and the shell part each independently may form a linear function varying with thickness of the particle from the center of the active material particle, or may be a quadric function. In addition, the concentration gradient slope of the lithium in the core part and the concentration gradient slope of the lithium in the shell part may have the same or different slope values.

Meanwhile, in the positive electrode active material having the core-shell structure, each of the core part and the shell part may include the lithium present with one concentration value in each region. In this case, the lithium concentration included in the core part may be higher than the lithium concentration included in the shell part.

In addition, in the case where the core part and the shell part each independently has different lithium concentration distribution, height difference according to the difference of the lithium concentration in the core part and the shell part may be formed at the contacting interface of the core part and the shell part.

Meanwhile, the positive electrode active material having the core-shell structure may include lithium distributed with a gradually increasing concentration gradient from the surface to the center of the particle over the whole active material particles. In this case, in Formula 1 and 2, a may decrease toward the center of the particle within a range of 0<a≤0.05, and b may increase toward the center of the particle within a range of 1≤b≤1.2. In addition, the concentration gradient slope of the lithium may each independently may be a linear function varying with thickness of the particle from the center of the active material particle, or may be a quadric function. With the concentration gradient over the whole particles, a rapid phase boundary region is not present from the center to the surface, thereby stabilizing a crystal structure and increasing thermal stability. In addition, if the concentration gradient slope of a metal is constant, the improving effect of structural stability may be increased further.

In the present invention, the concentration change of the lithium in the surface and the inner part of the particle may be measured by a common method, and specifically the concentration of the lithium and other elements present in the surface may be measure by an X-ray photoelectron spectroscopy (XPS), a transmission electron microscopy (TEM), or an energy dispersive x-ray spectroscopy (EDS). The lithium component in the lithium cobalt oxide may be measured using an inductively coupled plasma-atomic emission spectrometer (ICP-AES), and the shape of the lithium cobalt oxide may be identified using a time of flight secondary ion mass spectrometry (ToF-SIMS).

In the present invention, the "surface side" of the lithium cobalt oxide particle means the surface and an adjacent region to the surface excluding the center of the particle, and particularly means a region corresponding to a distance from the surface to the center of the lithium cobalt oxide particle, that is, a distance from 0% to less than 100% from the surface of the particle relative to the radius of the lithium cobalt oxide. In addition, the shell part of the lithium cobalt oxide particle is a region corresponding to a distance from the surface to the center of the lithium cobalt oxide particle, that is, a distance from 0% to 99%, and more particularly, a distance from 0% to 95% from the surface of the particle relative to the radius of the particle. Accordingly, the core part is present in the inner part of the shell part and means a region excluding the shell part from the lithium cobalt oxide particle.

Particularly, in the lithium cobalt oxide particle, the radius of the core part and the thickness of the shell part may have a thickness ratio from 1:0.01 to 1:0.1. In the case where the radius of the core part deviates above ratio range and is excessively large, the increasing effect of the mobility of lithium ions according to the formation of the shell part including the lithium deficient lithium cobalt oxide and the resultant improving effect of battery properties may be trivial, and in the case where the thickness of the shell part deviates the above thickness ratio and is excessively thick, the core part may be relatively decreased, and the structural stabilizing effect inside the active material particle may be trivial. More particularly, under the conditions of the ratio of the radius of the core part and the thickness ratio of the shell part, the thickness of the shell part may be from 1 to 500 nm, or from 10 to 450 nm.

In the positive electrode active material for a lithium secondary battery according to an embodiment of the present invention, the second lithium cobalt oxide with the lithium deficient structure may be included in an amount ratio from 10 to 30 wt % relative to the total weight amount of the positive electrode active material. If the amount of the second lithium cobalt oxide is less than 10 wt %, the improving effect due to the formation of the lithium deficient structure may be trivial, and if the amount is greater than 30 wt %, capacity may decrease, and the structural may be collapsed.

In the present invention, the content of the second lithium cobalt oxide having the lithium deficient structure may be confirmed by identifying Li surface deficient structure in the shell by the analysis using TEM, identifying the thickness thereof to confirm the mass ratio through the total volume ratio or by dissolving the lithium cobalt oxide particle from the surface little by little by controlling the dissolving time in a weak acid during an ICP analysis, analyzing the ratio of Li/transition metal (for example, Co) through the filtrate, and measuring the weight of undissolved part.

The positive electrode active material according to an embodiment of the present invention has a monolith structure formed from the primary particles of the lithium cobalt oxide.

In the present invention, a "monolith structure" means a structure present morphologically in an independent phase in which particles are not agglomerated each other. A particle structure in contrast to the monolith structure may include a structure forming a relatively large-sized particle shape (secondary particles) via physical and/or chemical agglomeration of relatively small-sized particles (primary particles).

Generally, the size of the particles of the positive electrode active material is preferably large for attaining a high capacity of a battery, however in this case, since the surface area is relatively small, there is a problem that rate characteristic and an initial capacity are deteriorated due to reduction of the active area making a contact with an electrolyte. In order to solve the defects, the positive electrode active material of secondary particle phase obtained by assembling the primary particles of fine particles are mainly used. However, in the case of the positive electrode active material with the granulated second particles, lithium ions may react with moisture or $CO_2$ in the air to easily form surface impurities such as $Li_2CO_3$, and LiOH while moving toward the surface of the active material, and the surface impurities thus formed may reduce the capacity of a battery or may be decomposed in the battery to generate gas, thereby causing the swelling of the battery. Therefore, the stability at high temperatures may become serious. However, the positive electrode active material according to an embodiment of the present invention has the monolith structure, and there would be no worries on the generation of the defects of the positive electrode active material having the secondary particle phase.

The positive electrode active material having the monolith structure may have an average particle diameter ($D_{50}$) from 3 μm to 50 μm in consideration of the specific surface area and the density of a positive electrode mixture and may have a greater average particle diameter ($D_{50}$) from 10 μm to 50 μm due to the structural characteristic enabling the easy intercalation and deintercalation of lithium ions.

In the present invention, the average particle diameter ($D_{50}$) of the lithium cobalt oxide particles may be defined by the particle diameter on the basis of 50% of the particle diameter distribution. The average particle diameter ($D_{50}$) of the lithium cobalt oxide particles may be measured using, for example, a laser diffraction method. Particularly, by dispersing the lithium cobalt oxide particles in a dispersion medium, introducing thereof to a commercially available laser diffraction particle size measuring apparatus (for example, Microtrac MT 3000), irradiating ultrasonic waves of about 28 kHz with the output of 60 W, and computing the average particle diameter ($D_{50}$) on the basis of 50% of the particle diameter distribution in the measuring apparatus.

The positive electrode active material according to an embodiment of the present invention may be prepared by a method including a step of preparing second lithium cobalt oxide particles by mixing a cobalt raw material and a lithium raw material in amounts satisfying the relation of 1≤Li/Co molar ratio, and first heating (Step 1), and a step of conducting second heating more than once with respect to the second lithium cobalt oxide particles (Step 2). According to another embodiment of the present invention, a method of preparing the positive electrode active material for a lithium secondary battery is provided.

Hereinafter, each step will be described in detail, and Step 1 is a step for preparing second lithium cobalt oxide particles.

Particularly, a second lithium cobalt oxide particle may be manufactured by mixing the cobalt raw material and the lithium raw material in amounts satisfying the relation of 1≤Li/Co molar ratio, and first heating.

In this case, the cobalt raw material may particularly be a cobalt-containing oxide, hydroxide, oxyhydroxide, halogenide, nitrate, carbonate, acetate, oxalate, citrate, or sulfate, and may more particularly be $Co(OH)_2$, CoO, CoOOH, $Co(OCOCH_3)_2 \cdot 4H_2O$, $Co(NO_3)_2 \cdot 6H_2O$, or $Co(SO_4)_2 \cdot 7H_2O$, or may be a mixture of two or more thereof.

The lithium raw material may particularly be a lithium-containing oxide, hydroxide, oxyhydroxide, halogenide, nitrate, carbonate, acetate, oxalate, citrate, or sulfate, and may more particularly be $Li_2CO_3$, $LiNO_3$, $LiNO_2$, LiOH, LiOH.H$_2$O, LiH, LiF, LiCl, LiBr, LiI, Li$_2$O, Li$_2$SO$_4$, CH$_3$COOLi, or Li$_3$C$_6$H$_5$O$_7$, or may be a mixture of two or more thereof.

The cobalt raw material and the lithium raw material may be mixed in amounts such that a Li/Co molar ratio satisfies the relation of 1≤Li/Co molar ratio. With the mixing amount range, a core including lithium rich lithium cobalt oxide having a layered structure may be formed. More particularly, in consideration of remarkable improving effect, the cobalt raw material and the lithium raw material may be mixed in amounts such that a Li/Co molar ratio satisfies the relation of 1≤Li/Co molar ratio≤1.2, and more particularly, the relation of 1≤Li/Co molar ratio≤1.1. In addition, the decreasing concentration gradient of lithium concentration from the center to the surface of the particle in the second lithium cobalt oxide particle may be attained by injecting the cobalt raw material and the lithium raw material such that a Li/Co molar ratio may decrease within a range of 1≤Li/Co molar ratio≤1.2 according to the lapse of time.

In the case where the second lithium cobalt oxide thus prepared is doped, the raw material of a metal element (M') for doping may be selectively added further during mixing the cobalt raw material and the lithium raw material.

The raw material of the metal element (M') for doping may particularly be at least one metal selected from the group consisting of W, Mo, Zr, Ti, Mg, Ta, Al, Fe, V, Cr, Ba, Ca, and Nb, or an oxide, a hydroxide, an oxyhydroxide, a halogenide, a nitrate, a carbonate, an acetate, an oxalate, a citrate, or a sulfate including thereof, or a mixture of two or more thereof may be used.

The first heating of the mixture of the raw materials may be conducted at a temperature from 800° C. to 1,100° C. if the heating temperature is less than 800° C., an unreacted raw material may remain, and discharge capacity per unit weight may be decreased, and cycle property and an operation voltage may be deteriorated. If the heating temperature is greater than 1,100° C., by-products may be produced, and discharge capacity per unit weight may be decreased, and cycle property and an operation voltage may be deteriorated.

The first heating may preferably be conducted at temperatures lower than temperatures for the following second heating and within the above-described temperature range so as to easily control the diffusion rate of lithium.

In addition, the first heating may be conducted in the air or under an oxygen atmosphere for 5 to 30 hours for sufficient diffusion reaction between particles of the mixture.

Then, Step 2 is a step for preparing lithium deficient first lithium cobalt oxide in the surface of the second lithium cobalt oxide particles prepared in Step 1.

Particularly, the lithium deficient first lithium cobalt oxide may be prepared by second heating the second lithium cobalt oxide particles prepared in Step 1 at a temperature from 800° C. to 1,100° C., more than once, more particularly, from one to three times, and still more particularly, once or twice. In this case, the temperature for each heating may be the same or different within the above-described temperature range.

According to the formation of lithium oxide by the reaction of lithium present at the surface of the second lithium cobalt oxide particles with oxygen in the air during the second heating, the lithium deficient first lithium cobalt oxide may be formed. In addition, as the number of the second heating increases, the lithium deficiency in the lithium cobalt oxide may be also increased, and as a result, concentration gradient with decreasing lithium concentration from the center to the surface of the first lithium cobalt oxide may be formed.

During the second heating, a cobalt raw material, or a cobalt raw material and a lithium raw material may be selectively added further. The materials may be added all at once, or separately in each step with the same amount or different amounts step by step.

Particularly, in the case where only the cobalt raw material is selectively added further, the cobalt in the cobalt raw material and the lithium present at the surface of the second lithium cobalt oxide particles may be subjected to a reaction so as to produce lithium deficient lithium cobalt oxide having a Li/Co molar ratio of less than 1. In this case, the cobalt raw material may be the same as those described above, and the amount used may be appropriately controlled according to the concentration gradient of Li.

In the case where the cobalt raw material and the lithium raw material are selectively added further, the cobalt raw material and the lithium raw material may be added in amounts satisfying the relation of 0<Li/Co molar ratio<1, or 0.95≤Li/Co molar ratio<1, and more particularly, the relation of 0.95≤Li/Co molar ratio≤0.99. Where the cobalt raw material and the lithium raw material are mixed in the above-described amount range, a layer including lithium deficient lithium cobalt oxide may be formed. In this case, the cobalt raw material and the lithium raw material may be the same as those described in Step 1.

In the case where the first lithium cobalt oxide thus prepared is doped, the raw material of a metal element (M) for doping may be selectively added further during mixing the cobalt raw material and the lithium raw material.

The raw material of the metal element (M) for doping may particularly be at least one metal selected from the group consisting of W, Mo, Zr, Ti, Mg, Ta, Al, Fe, V, Cr, Ba, Ca, and Nb, or an oxide, a hydroxide, an oxyhydroxide, a halogenide, a nitrate, a carbonate, an acetate, an oxalate, a citrate, or a sulfate including thereof, or a mixture of two or more thereof may be used.

Meanwhile, the second heating in Step 2 may be conducted at a temperature from 800° C. to 1,100° C. If the heating temperature is less than 800° C., the crystallization of lithium cobalt oxide formed in the surface may be insufficiently proceed, and the transport of lithium ions may be inhibited. If the heating temperature is greater than 1,100° C., the crystallization may be excessively proceed, or an unstable structure may be formed due to the evaporation of Li in a crystal structure. The second heating in Step 2 may preferably be conducted at a temperature from 1,000° C. to 1,100° C. to prevent the deterioration of discharge capacity per unit weight and the deterioration of cycle property and an operation voltage, due to a remaining unreacted raw material, the production of by-products, and the non-crystallization or over-crystallization of the lithium cobalt oxide thus produced.

Since the transport and the diffusion of the lithium in the active material may be promoted with the increase of the second heating temperature, the distribution of the lithium in the active material may be controlled according to the second heating temperature. Particularly, in the case where the second heating temperature within the temperature range is 1,000° C. or more, or from 1,000° C. to 1,100° C., the lithium may be distributed with concentration gradient in the active material.

In addition, the second heating may be conducted in the air or under an oxygen atmosphere for 7 to 50 hours. If the heating time is excessively long, the evaporation of the lithium and the crystallinity of the metal oxide layer formed on the surface may increase, thereby inducing limitations on the transport of the lithium ions.

The preparation method of the positive electrode active material according to an embodiment of the present invention is a dry method not using a solvent.

In a wet method using a solvent for preparing a positive electrode active material and for surface treating, a metal precursor is used after dissolving in a solvent, and the pH change of the solvent may be easy, and the size of the positive electrode active material finally prepared may be easily changed, or particle cleavage may be induced. In addition, lithium ions may be eluted from the surface of the positive electrode active material including lithium, and various oxides may be formed as by-products at the surface. On the contrary, the positive electrode active material may be prepared by the dry method in the present invention, the defects due to the use of the solvent may not be generated, and the preparation efficiency and the process availability of the active material may be good. In addition, according to the surface treatment by the dry method, a binder is not used, and by-products due to the use of the binder may not be generated.

Since the positive electrode active material prepared by the above-described preparation method includes lithium cobalt oxide having a lithium deficient structure by which the intercalation and the deintercalation of lithium may be easy at the surface side of the lithium cobalt oxide particles having a monolith structure, good output property and rate characteristic may be obtained. In addition, since the lithium deficient structure is formed in the surface side of the particle, kinetically favorable, and good output and discharge rate properties may be obtained even with large-sized particles. In addition, specific surface area may decrease due to the increase of the size of the active material particle, and the amount of the lithium cobalt oxide may decrease due to the formation of the lithium deficient structure, and so, the reactivity with an electrolyte may decrease, and the amount of gas generated during driving a battery may decrease.

According to another embodiment of the present invention, a positive electrode and a lithium secondary battery including the positive electrode active material are provided.

Particularly, the positive electrode may include a positive electrode current collector, and a positive electrode active material layer formed on the positive electrode current collector and including the positive electrode active material.

The positive electrode current collector may use any material that may not induce the chemical change of a battery and have conductivity, without specific limitation, and may include, for example, stainless steel, aluminum, nickel, titanium, baked carbon, or a surface treated material on the surface of aluminum or stainless steel with carbon, nickel, titanium, silver, etc. Generally, the positive electrode current collector may have a thickness from 3 to 500 µm, and the adhesiveness of the positive electrode active material may be increased by forming fine concavo-convex on the surface of the current collector. For example, various shapes including a film, a sheet, a foil, a net, a porous body, a foamed body, a non-woven fabric body, etc. may be used.

Meanwhile, the positive electrode active material layer may include a conductive material and a binder together with the positive electrode active material. In this case, the positive electrode active material may be the same as those described above.

The conductive material is used to impart an electrode with conductivity, and any material that may not induce chemical change in a battery and have electron conductivity may be used, without specific limitation. Particular example may include graphite such as natural graphite and artificial graphite; a carbon-based material such as carbon black, acetylene black, ketchen black, channel black, furnace black, lamp black, thermal black, and carbon fibers; a metal powder or a metal fiber of copper, nickel, aluminum, silver, or the like; conductive whisker such as zinc oxide, and potassium titanate; a conductive metal oxide such as titanium oxide; or a conductive polymer such as polyphenylene derivatives, and the material may be used alone or as a mixture of two or more thereof. Generally, the conductive material may be included in an amount ratio from 1 to 30 wt % relative to the total weight amount of the positive electrode active material layer.

The binder plays the role of improving adhesiveness between the positive electrode active material particles, and between the positive electrode active material and the current collector. Particularly, polyvinylidene fluoride (PVDF), vinylidenefluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, a styrene butadiene rubber (SBR), a fluorine rubber, or diverse copolymers thereof may be used, and the material may be used alone or as a mixture of two or more thereof. The binder may be included in an amount ratio from 1 to 30 wt % relative to the total weight amount of the positive electrode active material layer.

The positive electrode having the above-described structure may be manufactured by a common method of manufacturing a positive electrode except for using the above-described positive electrode active material. Particularly, a composition for forming a positive electrode active material layer obtained by dissolving and dispersing the positive electrode active material, the binder, and the conductive material in a solvent may be applied on the positive electrode current collector, dried, and rolled to manufacture the positive electrode active material layer. In this case, the kind and the amount of the positive electrode active material, the binder, and the conductive material are the same as those described above.

In addition, the solvent in the composition for forming the positive electrode active material layer may be a commonly used solvent in the art and may be dimethyl sulfoxide (DMSO), isopropyl alcohol, N-methylpyrrolidone (NMP), acetone, or water, and the solvent may be used alone or as a mixture of two or more thereof. The amount used of the solvent may be sufficient if the composition has a viscosity capable of forming good thickness uniformity during applying for manufacturing a positive electrode after dissolving or dispersing the positive electrode active material, the conductive material, and the binder therein, in consideration of the applying thickness of a slurry and a production yield.

According to another method, the positive electrode may be manufactured by laminating a film obtained by casting the composition of the positive electrode active material on a separate support and separating from the support, on the positive electrode current collector.

According to a further another embodiment of present invention, an electrochemical device including the positive electrode is provided. The electrochemical device may particularly be a battery or a capacitor, and may more particularly be a lithium secondary battery.

The lithium secondary batter may include a positive electrode, a negative electrode facing the positive electrode, a separator disposed between the positive electrode and the negative electrode, and an electrolyte. The positive electrode is the same as described above. In addition, the lithium secondary battery may further and selectively include a battery vessel receiving an electrode assembly of the positive electrode, the negative electrode, and the separator, and a sealing member for sealing the battery vessel.

In the lithium secondary battery, the negative electrode may include a negative electrode current collector, and a negative electrode active material layer disposed on the negative electrode current collector.

The negative electrode current collector may be any material that may not induce the chemical change of a battery and have conductivity, without specific limitation, and may include, for example, copper, stainless steel, aluminum, nickel, titanium, baked carbon, a surface treated material on the surface of copper or stainless steel with carbon, nickel, titanium, silver or the like, or an alloy of aluminum-cadmium. Generally, the negative electrode current collector may have a thickness from 3 to 500 μm, and the adhesiveness of the negative electrode active material may be reinforced by forming fine concavo-convex on the surface of the current collector as in the positive electrode current collector. For example, various shapes including a film, a sheet, a foil, a net, a porous body, a foamed body, a non-woven fabric body, etc. may be used.

The negative electrode active material layer may selectively include a binder and a conductive material together with the negative electrode active material. The negative electrode active material layer may be manufactured by, for example, applying a composition for forming a negative electrode including a negative electrode active material, and selectively a binder and a conductive material on a negative electrode current collector, and drying, or may be manufactured by laminating a film obtained by casting the composition for forming the negative electrode on a separate support and separating from the support, on the negative electrode current collector.

The negative electrode active material may be a compound capable of performing reversible intercalation and deintercalation of lithium. Particular examples may include a carbon material such as artificial graphite, natural graphite, graphitized carbon fiber, and amorphous carbon; a metallic compound capable of forming an alloy with lithium such as Si, Al, Sn, Pb, Zn, Bi, In, Mg, Ga, Cd, an Si alloy, an Sn alloy, or an Al alloy; a metal oxide capable of doping and dedoping lithium such as $SiO_x$ (0<x<2), $SnO_2$, vanadium oxide, and lithium vanadium oxide; a composite including the metallic compound and the carbon material such as an Si—C composite or an Sn—C composite, and any one or a mixture of two or more thereof may be used. In addition, a metal lithium thin film may be used as the negative electrode active material. As the carbon material, both carbon with low crystallinity and carbon with high crystallinity may be used. The carbon with low crystallinity may typically include soft carbon and hard carbon, and the carbon with high crystallinity may typically include amorphous, platy, scaly, spherical or fibrous natural graphite or artificial graphite, and baked carbon at high temperatures such as kish graphite, pyrolytic carbon, mesophase pitch based carbon fiber, meso-carbon microbeads, mesophase pitches, and petroleum or coal tar pitch derived cokes.

The binder and the conductive material may be the same as those illustrated in the description of the positive electrode.

Meanwhile, the separator in the lithium secondary battery separates a negative electrode and a positive electrode and provides a transport passage of lithium ions. The separator may be any one used in a common lithium secondary battery, without specific limitation, and particularly, a separator having low resistance to the ion transport in an electrolyte and good impregnation capacity of the electrolyte may be preferable. Particularly, a porous polymer film, for example, a porous polymer film prepared using a polyolefin-based polymer such as an ethylene homopolymer, a propylene homopolymer, an ethylene/butene copolymer, an ethylene/hexene copolymer, and an ethylene/methacrylate copolymer, or a layered structure of two layer or more thereof may be used. In addition, a commonly used porous non-woven fabric, for example, a non-woven fabric formed using a glass fiber having a high melting point, a polyethylene terephthalate fiber, etc. may be used. Further, a coated separator including a ceramic component or a polymer material may be used for securing heat resistance or mechanical strength, and a single layer structure or a multilayer structure may be selectively used.

As the electrolyte used in the present invention, an organic liquid electrolyte, an inorganic liquid electrolyte, a solid polymer electrolyte, a gel type polymer electrolyte, a solid inorganic electrolyte, a melting inorganic electrolyte, etc. may be used, without limitation.

Particularly, the electrolyte may include an organic solvent and a lithium salt.

As the organic solvent, any solvent that may play the role of a medium for transporting ions participating in the electrochemical reaction of a battery may be used, without specific limitation. Particularly, the organic solvent may include an ester-based solvent such as methyl acetate, ethyl acetate, γ-butyrolactone, and ε-caprolactone; an ether-based solvent such as dibutyl ether, and tetrahydrofuran; a ketone-based solvent such as cyclohexanone; an aromatic hydrocarbon-based solvent such as benzene, and fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), and propylene carbonate (PC); an alcohol-based solvent such as ethyl alcohol, and isopropyl alcohol; nitriles such as R—CN (where R is C2-C20 hydrocarbon group of linear, branched or cyclic structure and may include a double bond aromatic ring or an ether bond); amides such as dimethyl formamide; dioxolanes such as 1,3-dioxolane; or sulfolanes. Among the solvents, the carbonate solvent is preferable, and a mixture of a cyclic carbonate having high ion conductivity and high dielectricity capable of increasing the charge discharge performance of the battery (for example, ethylene carbonate or propylene carbonate) and a linear carbonate compound having a low viscosity (for example, ethyl methyl carbonate, dimethyl carbonate, or diethyl carbonate) is more preferable. In this case, the cyclic carbonate and the linear carbonate may be mixed in a volume ratio from about 1:1 to about 1:9 for attaining good electrolyte performance.

The lithium salt may be any compound capable of providing lithium ions used in a lithium secondary battery, without specific limitation. Particularly, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2FsSO_3)_2$, $LiN(C_2F_5SO_2)_2$, $LiN(CF_3SO_2)_2$, $LiCl$, $LiI$, or $LiB(C_2O_4)_2$. The concentration of the lithium salt may be within a range from 0.1 to 2.0 M. If the concentration of the lithium salt is in the above-described range, an electrolyte may have an appropriate conductivity and viscosity, thereby providing good electrolyte performance and effective transport of lithium ions.

In the electrolyte, may further include at least one additive such as a haloalkylene carbonate-based compound such as difluoroethylene carbonate, pyridine, triethyl phosphite, triethanolamine, cycle ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol, or trichloroaluminum other than the components of the electrolyte in order to improve the life property of a battery, to restrain the capacity decrease of a battery, to improve the discharge capacity of a battery, etc. The additive may be included in an amount ratio from 0.1 to 5 wt % relative to the total weight amount of the electrolyte.

A lithium secondary battery including the positive electrode active material according to the present invention has good discharge capacity and output property, and stable capacity maintenance rate, and may be usefully used in a portable device such as a cellular phone, a laptop computer, and a digital camera, and an electric vehicle field including a hybrid electric vehicle (HEV), etc.

According to another aspect of the present invention, there are provided a battery module including the lithium secondary battery as a unit cell and a battery pack including the battery module.

The battery module or the battery pack may be used as a power source of at least one medium and large size device of power tools; electric vehicles such as an electric vehicle (EV), a hybrid electric vehicle, and a plug-in hybrid electric vehicle (PHEV); or an energy storage system.

Hereinafter, the present invention will be explained in more detail referring to the following examples. However, the examples may include various different modifications, and the scope of the present invention is not limited thereto.

Preparation Example 1: Preparation of Positive Electrode Active Material

A $Li_2CO_3$ powder and a $Co_3O_4$ powder were mixed in certain amounts such that a Li/Co molar ratio was gradually decreased according to the lapse of time within a range from 1.0 to 1.02, followed by first heating at 900° C. for 10 hours. The powder thus obtained was ground and screened to prepare second lithium cobalt oxide particles.

With respect to the second lithium cobalt oxide particles thus prepared, a $Li_2CO_3$ powder and a $Co_3O_4$ powder in certain amounts such that a Li/Co molar ratio was 0.95, were dry mixed, followed by second heating at 1,050° C. for 20 hours to prepare a positive electrode active material with a monolith structure (Average particle diameter: 10 μm), in which lithium was distributed with a decreasing concentration gradient from the center to the surface of the particle over the whole particles.

Preparation Example 2: Preparation of Positive Electrode Active Material

A $Li_2CO_3$ powder and a $Co_3O_4$ powder were mixed in certain amounts such that a Li/Co molar ratio was 1, followed by heating at 900° C. for 10 hours to prepare second lithium cobalt oxide particles.

The second lithium cobalt oxide thus prepared was heated at 900° C. for 5 hours under an oxygen atmosphere, and this procedure was twice repeatedly conducted to prepare a positive electrode active material with a monolith structure (Average particle diameter: 10 μm), in which lithium cobalt oxide with a lithium deficient structure was distributed with a concentration gradient in the surface side of the particle.

Preparation Example 3: Preparation of Positive Electrode Active Material

A $Li_2CO_3$ powder and a $Co_3O_4$ powder were mixed such that a Li/Co molar ratio was 1, followed by heating at 900° C. for 10 hours to prepare second lithium cobalt oxide particles.

The second lithium cobalt oxide thus prepared was heated at 900° C. for 5 hours under an oxygen atmosphere, and this procedure was twice repeatedly conducted. In each heating step, $Co_3O_4$ was injected in an amount of 0.05 mol and 0.25 mol, respectively. As a result, a positive electrode active material with a monolith structure (Average particle diameter: 10 μm), in which lithium cobalt oxide with a lithium deficient structure was distributed with a concentration gradient in the surface side of the particle, was prepared.

Preparation Example 4: Preparation of Positive Electrode Active Material

A $Li_2CO_3$ powder and a $Co_3O_4$ powder were mixed in certain amounts such that a Li/Co molar ratio was 1.02, followed by first heating at 900° C. for 10 hours. The powder thus obtained was ground and screened to prepare second lithium cobalt oxide particles.

With respect to the second lithium cobalt oxide particles thus prepared, a $Li_2CO_3$ powder and a $Co_3O_4$ powder were dry mixed in certain amounts such that a Li/Co molar ratio was 0.95, followed by second heating at 1,050° C. for 20 hours to prepare a positive electrode active material with a monolith structure (Average particle diameter: 12 μm), in which lithium was distributed with a decreasing concentration gradient from the center to the surface of the particle over the whole particles.

Preparation Example 5: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

With respect to the second lithium cobalt oxide particles thus prepared, a $Li_2CO_3$ powder and a $Co_3O_4$ powder were dry mixed in certain amounts such that a Li/Co molar ratio was 0.95, followed by second heating at 900° C. for 20 hours to prepare a positive electrode active material with a monolith structure (Average particle diameter: 12 μm), in which first lithium cobalt oxide with a lithium deficient structure was included in the surface side of the particle.

Preparation Example 6: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

With respect to the second lithium cobalt oxide particles thus prepared, a $Li_2CO_3$ powder and a $Co_3O_4$ powder were dry mixed in certain amounts such that a Li/Co molar ratio was 0.95, and a $ZrO_2$ powder in a certain amount such that the amount of a Zr metal relative to 1 mol of Li was 0.01 mol, was additionally added and mixed, followed by second heating at 1,050° C. for 20 hours to prepare a positive electrode active material with a monolith structure (Average particle diameter: 12 µm), in which lithium cobalt oxide with a lithium deficient structure was distributed with a concentration gradient in the surface side of the particle, and the lithium cobalt oxide with a lithium deficient structure was doped with Zr.

Preparation Example 7: Preparation of Positive Electrode Active Material

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

With respect to the second lithium cobalt oxide particles thus prepared, a $Li_2CO_3$ powder and a $Co_3O_4$ powder were dry mixed in certain amounts such that a Li/Co molar ratio was 0.95, and MgO and $TiO_2$ powders were additionally added and mixed in certain amounts such that the amounts of Mg and Ti metals relative to 1 mol of Li were 0.01 mol, respectively, followed by second heating at 1,050° C. for 20 hours to prepare a positive electrode active material with a monolith structure (Average particle diameter: 12 µm), in which lithium was distributed with a decreasing concentration gradient from the center to the surface of the particle over the whole particles, and first lithium cobalt oxide with a lithium deficient structure doped with Mg and Ti was included in a shell part.

Examples 1 to 7: Manufacture of Lithium Secondary Batteries

Lithium secondary batteries were manufactured using each positive electrode active material prepared in Preparation Examples 1 to 7.

In detail, each positive electrode active material prepared in Preparation Examples 1 to 7, a carbon black conductive material, and a PVdF binder were mixed in an N-methyl pyrrolidone solvent in a weight ratio of 90:5:5 to prepare a composition (Viscosity: 5,000 mPa·s) for forming a positive electrode. The composition was applied on an aluminum current collector, dried, and rolled to manufacture a positive electrode.

Artificial graphite which is mesocarbon microbead (MCMB) as a negative electrode active material, a carbon black conductive material, and a PVdF binder were mixed in an N-methyl pyrrolidone solvent in a weight ratio of 85:10:5 to prepare a composition for forming a negative electrode. The composition was applied on a copper current collector to manufacture a negative electrode.

A porous polyethylene separator was disposed between the positive electrode and the negative electrode thus manufactured to manufacture an electrode assembly, and the electrode assembly was positioned in a case. An electrolyte was injected into the case to manufacture a lithium secondary battery. In this case, the electrolyte was prepared by dissolving 1.15 M of lithium hexafluorophosphate ($LiPF_6$) in an organic solvent including ethylene carbonate (EC)/dimethyl carbonate (DMC)/ethyl methyl carbonate (EMC) (Volume ratio of EC/DMC/EMC=3/4/3).

Comparative Example 1: Manufacture of Lithium Secondary Battery

A lithium secondary battery was manufactured by conducting the same procedure described in Example 1 except for using $LiCoO_2$ (Average particle diameter: 10 µm) as the positive electrode active material.

Comparative Example 2: Manufacture of Lithium Secondary Battery

A $Li_2CO_3$ powder and a $Co_3O_4$ powder were mixed in certain amounts such that a Li/Co molar ratio was 1, followed by first heating at 900° C. for 10 hours. The powder thus obtained was ground and screened to prepare second lithium cobalt oxide particles.

With respect to the second lithium cobalt oxide particles thus prepared, a $Li_2CO_3$ powder and a $Co_3O_4$ powder were dry mixed in certain amounts such that a Li/Co molar ratio was 1.2, followed by second heating at 1,050° C. for 20 hours to prepare a positive electrode active material (Average particle diameter: 10 µm) including lithium cobalt oxide ($Li_aCoO_2$, $0<a\leq0.2$) with higher lithium concentration in the surface of the second lithium cobalt oxide particles when compared to that in the core thereof.

Experimental Example 1

For the positive electrode active materials prepared in Preparation Examples 1 to 5, the molar ratio change of Li/Co according to a depth profile from the surface to the inner part of an active material particle was observed using an X-ray photoelectron spectroscopy (XPS). The results are shown in the following Tables 1 and 2.

TABLE 1

| Depth from the surface of positive electrode | Li/Co molar ratio | | |
|---|---|---|---|
| active material particle (nm) | Preparation Example 1 | Preparation Example 2 | Preparation Example 3 |
| 30 | 0.95 | 0.97 | 0.95 |
| 50 | 0.95 | 0.98 | 0.95 |
| 150 | 0.96 | 0.99 | 0.96 |
| 250 | 0.96 | 0.99 | 0.97 |
| 300 | 0.97 | 1.00 | 0.98 |
| 450 | 0.98 | 1.00 | 0.99 |
| 500 | 1.00 | 1.00 | 1.00 |
| 1,000 | 1.00 | 1.00 | 1.00 |
| 1,500 | 1.01 | 1.00 | 1.00 |
| 2,000 | 1.01 | 1.00 | 1.00 |
| 2,500 | 1.01 | 1.00 | 1.00 |
| 3,000 | 1.02 | 1.00 | 1.00 |
| 3,500 | 1.02 | 1.00 | 1.00 |
| 4,000 | 1.02 | 1.00 | 1.00 |
| 4,500 | 1.02 | 1.00 | 1.00 |
| 5,000 (particle center) | 1.02 | 1.00 | 1.00 |

TABLE 2

| Depth from the surface | Li/Co molar ratio | |
|---|---|---|
| of lithium cobalt oxide particle (nm) | Preparation Example 4 | Preparation Example 5 |
| 50 | 0.95 | 0.95 |
| 150 | 0.96 | 0.95 |
| 250 | 0.98 | 0.95 |
| 300 | 0.98 | 0.95 |
| 450 | 0.99 | 0.95 |
| 500 | 1.00 | 1.00 |
| 1,000 | 1.00 | 1.00 |
| 1,500 | 1.00 | 1.00 |
| 2,000 | 1.00 | 1.00 |

TABLE 2-continued

| Depth from the surface of lithium cobalt oxide particle (nm) | Li/Co molar ratio | |
|---|---|---|
| | Preparation Example 4 | Preparation Example 5 |
| 2,500 | 1.00 | 1.00 |
| 3,000 | 1.00 | 1.00 |
| 3,500 | 1.00 | 1.00 |
| 4,000 | 1.02 | 1.00 |
| 4,500 | 1.02 | 1.00 |
| 5,000 | 1.02 | 1.00 |
| 5,500 | 1.02 | 1.00 |
| 6,000 (particle center) | 1.02 | 1.00 |

As shown in Tables 1 and 2, a shell including the first lithium cobalt oxide having a lithium deficient structure is formed in a region corresponding to a distance ratio from 0.05 to 0.1 from the surface of the particle relative to the radius of the active material particle.

In addition, positive electrode active materials (Preparation Examples 1 and 4), in which lithium is distributed with a decreasing concentration gradient from the center to the surface of a particle over the whole particles were prepared via the control of the heating temperature and the continuous change of the amount ratio of injecting materials during preparation, positive electrode active materials (Preparation Examples 2 and 3), in which lithium cobalt oxide with a lithium deficient structure is distributed with a concentration gradient only in the surface side of a particle were prepared by repeating second heating, and a positive electrode active material (Preparation Example 5) without a concentration gradient over the whole particles and including lithium deficient lithium cobalt oxide only in the surface side of a particle was prepared, respectively. For the preparation of the positive electrode active material of Preparation Example 3, the second heating was repeatedly conducted, and cobalt oxide reactive with lithium was injected in each heating step one by one. Accordingly, the thickness of a shell part including the lithium deficient structure was greater, and the molar ratio of Li/Co in the shell part was rapidly changed.

Experimental Example 2

The lithium distribution in the surface side of the particle for the lithium cobalt oxide particles prepared in Preparation Example 2 was observed using an atom probe tomography (APT). The results are shown in FIG. 1.

In FIG. 1, a) show a lithium distribution in the surface side of the lithium cobalt oxide particle (to 50 mm from the surface to the center of the particle) of Preparation Example 2 observed by APT, and b) is a photographic image obtained by projecting 3D information in a) into 2D and measuring density.

As shown in FIG. 1, it may be confirmed that the density of lithium increases toward the center of the particle of the lithium cobalt oxide. Meanwhile, the yellow lithium rich portion at an upper right end portion in FIG. 1 is due to experimental errors.

Experimental Example 3

The crystal structures of the lithium cobalt oxide particles prepared in Preparation Example 2 were observed for the surface side and the inner part of an active material. The results are shown in FIG. 2.

Figure 2:
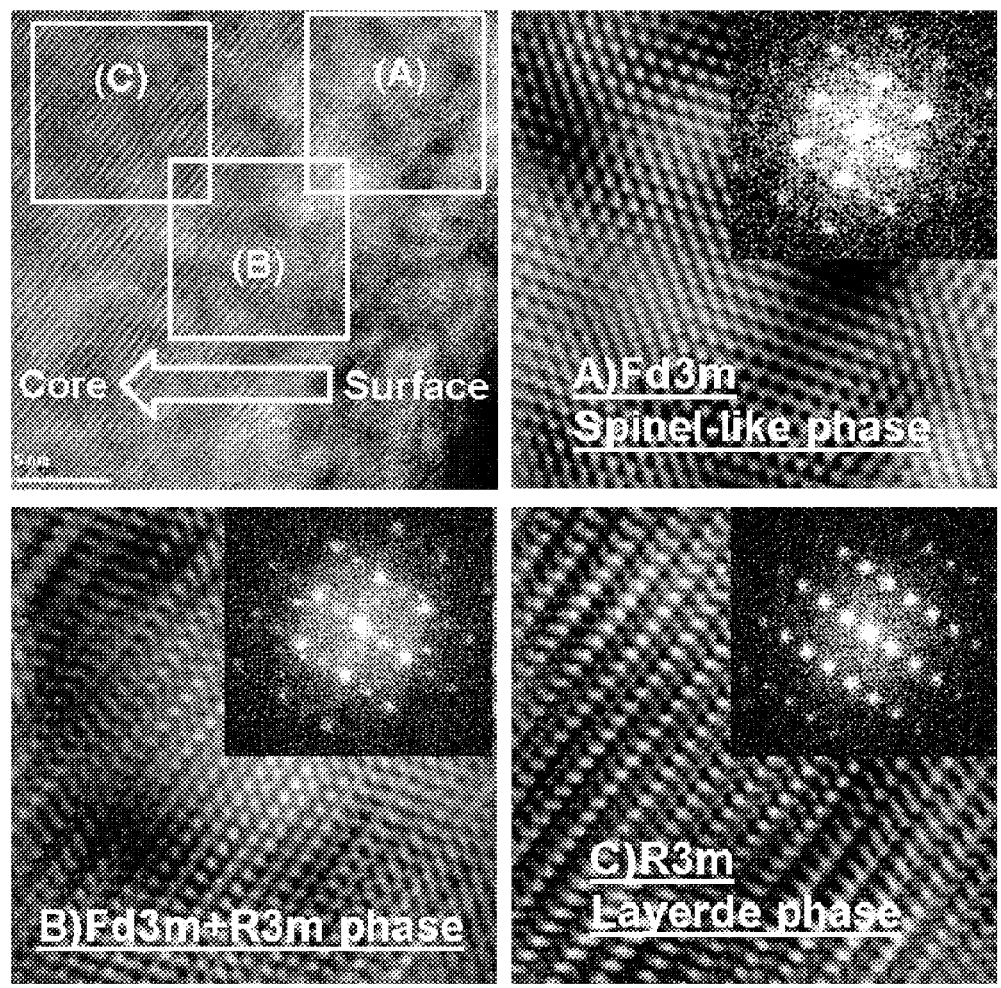
FIG. 2 illustrates photographic images for observing crystal structure of a positive electrode active material prepared in Preparation Example 2 using a transmission electron microscopy (TEM)

As shown in FIG. 2, the first lithium cobalt oxide present in the surface side of the lithium cobalt oxide particle (A) was identified to have a cubic crystal structure of an Fd-3m space group like a spinel crystal structure. Meanwhile, the second lithium cobalt oxide present inner part of the active material particle (C) was identified to have a layered crystal structure of a R 3m space group.

Experimental Example 4

Coin cells (using a Li metal negative electrode) were manufactured using the positive electrode active materials prepared in Preparation Example 1 and Comparative Example 1, and were charged and discharged under the conditions of room temperature (25° C.) and 0.1 C/0.1 C. Then, initial charge and discharge properties were evaluated, and the results are shown in FIG. 3.

Figure 3:
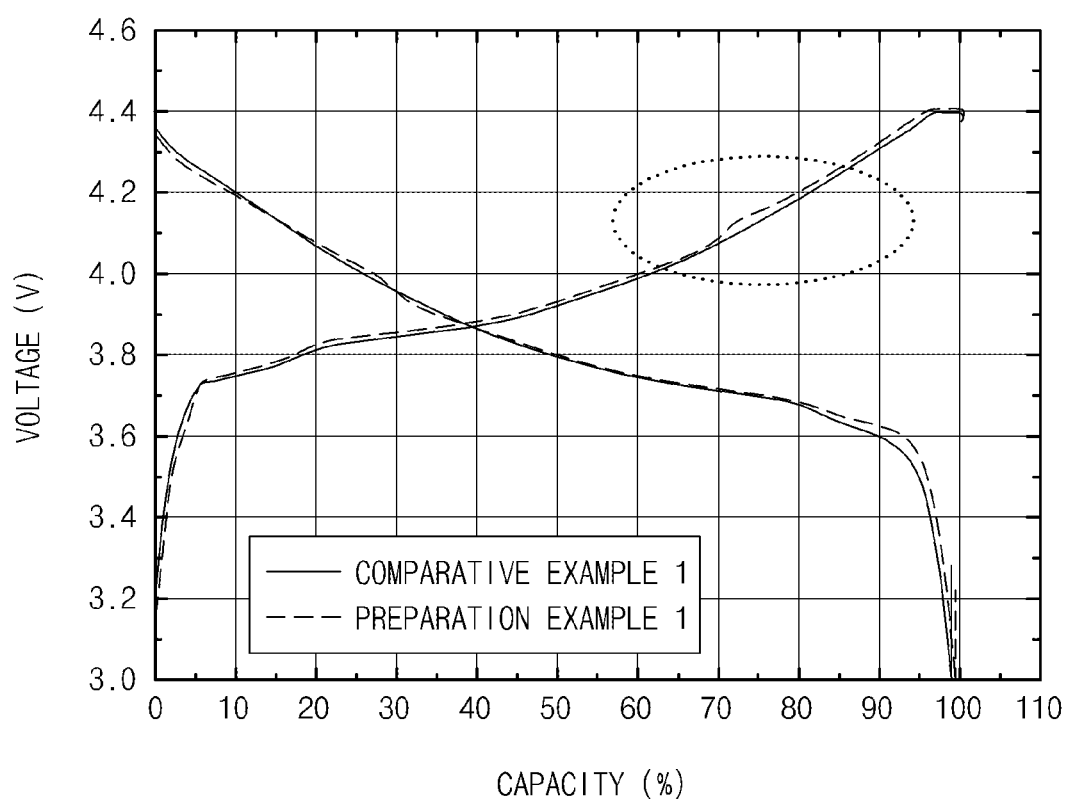
FIG. 3 is a graph illustrating initial charge and discharge properties of lithium secondary batteries including positive electrode active materials prepared in Preparation Example 1 and Comparative Example 1, respectively, during charging and discharging.

As shown in FIG. 3, the positive electrode active material of Preparation Example 1, having a lithium deficient structure in the surface side of the lithium cobalt oxide particle, that is, in a shell part, illustrates almost equal degree of charge and discharge properties when compared to the positive electrode active material of Comparative Example 1 without a lithium deficient structure. However, the bending of a voltage profile, that is, an inflection point was observed for the positive electrode active material of Preparation Example 1 between 4.05 and 4.15 V during charging and discharging due to the lithium deficient structure present in the shell part.

Experimental Example 5

Coin cells (using a Li metal negative electrode) manufactured using the positive electrode active materials prepared in Preparation Example 1 and Comparative Example 1 were charged and discharged under the conditions of room temperature (25° C.) and 0.1 C and 0.5 C, respectively. Then, rate characteristic was evaluated. The results are shown in FIG. 4.

Figure 4:
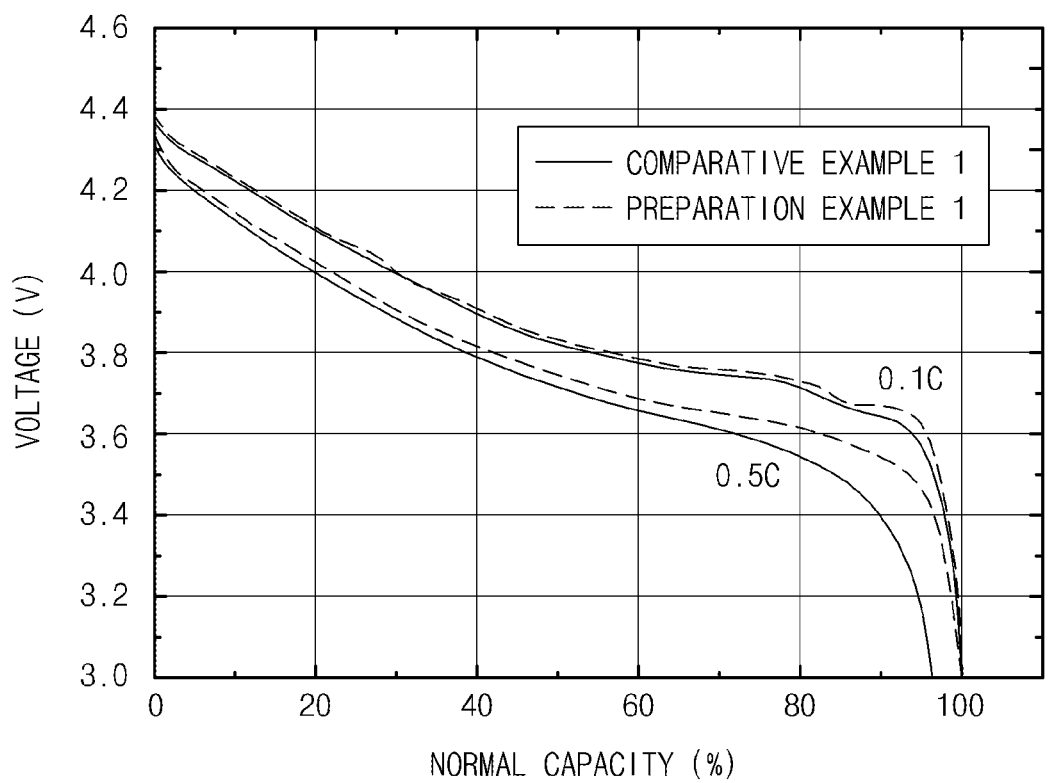
FIG. 4 is a graph illustrating rate properties of lithium secondary batteries including positive electrode active materials prepared in Preparation Example 1 and Comparative Example 1, respectively, during charging and discharging.

As shown in FIG. 4, a lithium secondary battery including the positive electrode active material of Preparation Example 1, having a lithium deficient structure in a shell has improved rate characteristic when compared to a lithium secondary battery of Comparative Example 1 including the positive electrode active material of $LiCoO_2$ without a lithium deficient structure.

Experimental Example 6

The battery properties of the lithium secondary batteries manufactured in Examples 1 and 2 and Comparative Example 1 were evaluated by the following method.

In detail, for the lithium secondary batteries manufactured in Examples 1 and 2 and Comparative Example 1, the rate characteristic during charging and discharging was measured under the conditions of room temperature (25° C.) within a driving voltage range from 3 V to 4.4 V and 2 C/0.1 C, and cycle capacity retention which is the ratio of a discharge capacity at $50^{th}$ cycle with respect to an initial capacity, was measured after charging and discharging for 50 cycles under the conditions of a high temperature (60° C.) within a driving voltage range from 3 V to 4.4 V and 0.5 C/1 C. The results are shown in the following Table 3.

TABLE 3

| | Rate characteristic (2 C/0.1 C, %) at room temperature (25° C.) | 50$^{th}$ cycle capacity retention (%) at high temperature (60° C.) |
|---|---|---|
| Comparative Example 1 | 91.5 | 94.4 |
| Example 1 | 97.1 | 96.2 |
| Example 2 | 97.1 | 96.2 |

From the experimental results, the batteries of Examples 1 and 2 including the lithium cobalt oxide having a lithium deficient structure showed improved rate characteristic and life property when compared to the battery of Comparative Example 1 including the lithium cobalt oxide without the lithium deficient structure as the positive electrode active material.

Experimental Example 7: Evaluation of Gas Generation Amount in Lithium Secondary Battery Charging and discharging was conducted 50 times for the lithium secondary batteries manufactured in Example 1 and Comparative Examples 1 and 2 under the conditions of a high temperature (60° C.) within a driving voltage range from 3 V to 4.4 V and 0.5 C/1 C, and the gas generation amounts in the batteries were measured. The results are shown in the following Table 4.

TABLE 4

| | Gas generation amount (μl/mg) |
|---|---|
| Comparative Example 1 | 3 |
| Comparative Example 2 | 5 |
| Example 1 | 1 |

From the experimental results, the battery of Example 1 including the lithium cobalt oxide having a lithium deficient structure in the shell had markedly decreased gas generation amount when compared to the battery of Comparative Example 1 including the lithium cobalt oxide without the lithium deficient structure as the positive electrode active material and the battery of Comparative Example 2 in which the concentration of lithium in the lithium cobalt oxide in a shell was higher than that in a core.

The invention claimed is:

1. A method of preparing a positive electrode active material for a lithium secondary battery including lithium cobalt oxide particles having a core-shell structure comprising a core part and a shell part provided on a surface of the core part, the method comprising:

preparing initial lithium cobalt oxide particles by mixing a first amount of a cobalt raw material and a first amount of a lithium raw material in amounts satisfying a molar ratio of 1≤Li/Co≤1.2, and first heating under an air or oxygen atmosphere, so that a surface of the initial lithium cobalt oxide particles is exposed to the air or oxygen atmosphere during the first heating; and preparing the lithium cobalt oxide particles by second heating the initial lithium cobalt oxide particles to produce the shell part comprising the lithium deficient lithium cobalt oxide having the Li/Co molar ratio of less than 1, belonging to an Fd-3m space group and having a cubic crystal structure, wherein the second heating is conducted more than once, wherein the second heating is conducted under an air or oxygen atmosphere, so that the surface of the initial lithium cobalt oxide particles is exposed to the air or oxygen atmosphere during the second heating, wherein the second heating can comprise: further adding a raw material consisting of a second amount of the cobalt raw material, a second amount of the lithium raw material, or a combination therein, and wherein, when the second heating comprises further adding the raw material, the raw material is added in amounts satisfying a molar ratio of 0≤Li/Co<1.

2. The method of preparing the positive electrode active material for a lithium secondary battery of claim 1, wherein a metal-containing raw material comprising at least one metal element selected from the group consisting of W, Mo, Zr, Ti, Mg, Ta, Al, Fe, V, Cr, Ba, Ca, and Nb is further included during mixing the cobalt raw material and the lithium raw material in the preparing of the initial lithium cobalt oxide particles.

3. The method of preparing the positive electrode active material for a lithium secondary battery of claim 1, wherein the first heating is conducted by heating at a temperature from 800° C. to 1,100° C. in the atmosphere or an oxygen atmosphere.

4. The method of preparing the positive electrode active material for a lithium secondary battery of claim 1, wherein the second heating is conducted by heating at a temperature from 800° C. to 1,100° C. in the atmosphere or an oxygen atmosphere.

5. The method of preparing the positive electrode active material for a lithium secondary battery of claim 1, wherein the second heating is conducted twice at a temperature from 800° C. to 1,100° C., and the temperature during each heating is the same or different.

6. The method of preparing the positive electrode active material for a lithium secondary battery of claim 1, further comprising adding a cobalt raw material and a lithium raw material in amounts satisfying the following relation of 0.95<Li/Co molar ratio<1 during the second heating.

7. The method of preparing the positive electrode active material for a lithium secondary battery of claim 1, further comprising adding a metal-containing raw material including at least one metal element selected from the group consisting of W, Mo, Zr, Ti, Mg, Ta, Al, Fe, V, Cr, Ba, Ca, and Nb during the second heating.

8. The method of preparing the positive electrode active material for a lithium secondary battery of claim 1, wherein the method is a dry method not using a solvent.

* * * * *